(12) United States Patent
Fujita et al.

(10) Patent No.: US 7,000,493 B2
(45) Date of Patent: Feb. 21, 2006

(54) SCREW DEVICE HAVING LUBRICANT APPLYING PORTION

(75) Inventors: Satoshi Fujita, Tokyo-to (JP); Yoshiaki Saito, Yamanashi-ken (JP)

(73) Assignee: THK Co., Ltd., Tokyo-to (JP)

( * ) Notice: Subject to any disclaimer, the term of this patent is extended or adjusted under 35 U.S.C. 154(b) by 73 days.

(21) Appl. No.: 10/358,313

(22) Filed: Feb. 5, 2003

(65) Prior Publication Data
US 2003/0145670 A1    Aug. 7, 2003

(30) Foreign Application Priority Data
Feb. 7, 2002    (JP)    ............... 2002-030940

(51) Int. Cl.
F16H 27/02    (2006.01)
F16H 29/02    (2006.01)
F16H 1/18    (2006.01)

(52) U.S. Cl. ................. 74/89.44; 74/89.23; 74/89; 74/424.71

(58) Field of Classification Search ............. 74/89.44, 74/89.23, 89.4, 89.43, 89, 424.71, 424.84; 384/13; 184/5
See application file for complete search history.

(56) References Cited
U.S. PATENT DOCUMENTS

| | | | |
|---|---|---|---|
| 888,619 A * | 5/1908 | Kelly ................. 74/89.44 |
| 3,499,624 A * | 3/1970 | Custer ................. 410/61 |
| 5,168,767 A * | 12/1992 | Morita ................. 74/89.44 |
| 5,496,113 A * | 3/1996 | Winkelmann et al. ........ 384/13 |
| 5,555,771 A * | 9/1996 | Kuroiwa et al. ............ 74/89.4 |
| 5,695,288 A * | 12/1997 | Sugihara et al. ............ 384/13 |
| 6,023,991 A * | 2/2000 | Yabe et al. ................ 74/89.44 |
| 6,364,058 B1 * | 4/2002 | Nishide et al. ............... 184/5 |
| 6,568,508 B1 * | 5/2003 | Kinney et al. ................ 184/5 |
| 6,595,327 B1 * | 7/2003 | Keller ........................... 184/5 |
| 6,619,148 B1 * | 9/2003 | Nishide ...................... 74/89.44 |
| 6,715,920 B1 * | 4/2004 | Menges et al. ............. 384/45 |
| 6,752,245 B1 * | 6/2004 | Kato et al. ..................... 184/5 |

* cited by examiner

Primary Examiner—David Fenstermacher
Assistant Examiner—Colby Hansen
(74) Attorney, Agent, or Firm—Westerman, Hattori, Daniels & Adrian, LLP

(57) ABSTRACT

A screw device having a lubricant applying structure comprises a screw shaft provided with a spiral ball rolling groove, a nut provided with a loaded ball rolling groove having a spiral shape corresponding to the spiral ball rolling groove formed to the screw shaft, a number of balls disposed in a loaded rolling passage formed by the ball rolling groove and the loaded ball groove, a return member provided for the nut and arranged so as to connect one and another end portions of the loaded rolling passage so that the balls rolling the loaded rolling passage circulate, and a lubricant applying portion mounted to the return member so as to apply a lubricant. The lubricant applying portion is arranged inside the return member provided for the nut.

6 Claims, 16 Drawing Sheets

SCREW DEVICE HAVING LUBRICANT APPLYING PORTION

BACKGROUND OF THE INVENTION

1. Field of the Invention

The present invention relates to a screw device such as ball screw, roller screw or like, and more particularly, to a screw device having a lubricant applying portion that apply a lubricant to a rolling member rolling groove of a shaft.

2. Related Art

A screw device such as ball screw or roller screw is generally composed of a screw shaft having an outer peripheral surface on which a spiral rolling member rolling groove is formed, a nut having a inner peripheral surface on which a loaded rolling member rolling groove is formed so as to correspond to the rolling member rolling groove formed on the screw shaft, and a number of rolling members such as balls or rollers disposed in a loaded rolling member rolling passage (loaded rolling passage, called hereinlater) composed of the rolling member rolling groove of the screw shaft and the loaded rolling member rolling groove of the nut. In this structure, when the screw shaft is rotated relatively with respect to the nut, the nut is moved linearly with respect to the screw shaft and the rolling members performs a rolling motion in the loaded rolling passage.

A return member, forming a return passage, such as return pipe, deflector or the like is mounted to the nut so as to connect one and the other ends of the loaded rolling passage. The return member acts to scoop up the rolling member such as ball rolling on the loaded rolling passage at one end thereof, guide the ball in the return member and then return the ball to the loaded rolling passage at the other one end thereof. According to such action, the ball rolling in the loaded rolling passage circulates endlessly in a circulation passage composed of the loaded rolling passage and the return member.

A screw device of the structure mentioned above, lubrication is performed by using a lubricant applying member. Such lubricating member comprises a lubricant applying felt for applying lubricant to the screw shaft in contact with it and a lubricant storage chamber for supplying the lubricant to the lubricant applying felt. BY applying the lubricant to the rolling member rolling groove of the screw shaft, frictional force which acts on the surface of the rolling member rolling groove will be reduced or stress applied thereon will be weakened. As a result, usable life time of the screw shaft can be elongated against rolling fatigue.

The screw device of the type mentioned above may be utilized, for example, in place of a hydraulic cylinder device in an injection molding machine or press machine, for example, which is operated under a high load. In such a screw device, a high load is applied in operation and a stroke of the nut with respect to the screw shaft is set to be considerably short. When a high load is applied to such the screw shaft, since frictional force and stress acting on the surface of the rolling member rolling groove becomes large, a phenomenon of flaking, such that the surface of the rolling member rolling groove and the surface of the rolling member peel in form of a scale, likely occurs. And as a result, usable life time will be shortened because of rolling fatigue. In order to obviate such defect, and to improve and elongate the usable life time thereof, it is necessary to apply the lubricant to the rolling member rolling groove by utilizing the lubricating device.

With reference to FIG. 19, in a case that lubricating devices 2, 2 are mounted to both end portions of the nut 1 in the axial direction, the following problems or defects will occur.

That is, when the nut 1 is reciprocated in a stroke of a short range St, the lubricating devices 2, 2 are also reciprocated in the same short stroke. In such case, because the lubricating devices 2, 2 only apply the lubricant to short areas (shown with oblique lines) by lubricant applying felts 3,3 in accordance with the stroke St of the nut 1, there may cause a case that the lubricant do not reach an area (area inside the area shown with oblique lines) in which the rolling member rolls on a rolling member rolling groove 4a. In the case of such fear, oil film cannot be uniformly formed, and as a result, usable life time against the rolling fatigue of the screw device will be shortened.

SUMMARY OF THE INVENTION

An object of the present invention is therefore to substantially eliminate defects or drawbacks encountered in the prior art mentioned above and to provide a screw device having a lubricant applying member, which makes it possible to prevent a usable life time of the screw device against rolling fatigue from being reduced even in a case that a nut has a short stroke with respect to a screw shaft.

This and other objects can be achieved according to the present invention by providing a screw device comprising:

a screw shaft provided with a spiral rolling member rolling groove on an outer peripheral portion thereof;

a nut provided, on an inner peripheral portion thereof, with a loaded rolling member rolling groove having a spiral shape corresponding to the spiral rolling member rolling groove formed on the screw shaft;

a number of rolling members disposed in a loaded rolling passage formed by the rolling member rolling groove of the screw shaft and the loaded rolling member rolling groove of the nut;

a return member provided for the nut and arranged so as to connect one and another end portions of the loaded rolling passage so that the rolling members rolling on the loaded rolling passage circulate; and a lubricant applying portion provided for the return member so as to apply a lubricant by contacting with the rolling member rolling groove of the screw shaft, the lubricant applying portion being arranged inside the return member.

According to this main aspect of the present invention, since the lubricant applying portion is arranged inside the return member, the lubricant can be applied on the screw shaft at a portion near an area in which rolling member rolls on the rolling member rolling groove formed on the screw shaft. Accordingly, even in the case where the nut has a short stroke with respect to the screw shaft, the lubricant can be sufficiently applied to the area of the screw shaft mentioned above. In addition, just before the rolling member returns to the loaded rolling passage from the return member, the lubricant can be applied to the rolling member rolling groove of the screw shaft, so that the lubricant can be effectively supplied between the rolling member rolling groove and the rolling member.

In a preferred embodiment, the return member comprises a return pipe in which the lubricant applying portion is arranged.

In this embodiment, the return pipe is provided with scoop-up portions for scooping up the rolling member at both end portions thereof, and in a plan view, the lubricant applying portion is arranged to a center line of the screw shaft from the scoop-up portion to prevent the lubricant applying portion from contacting with the rolling member.

According to the preferred embodiments mentioned above, the lubricant applying portion can be prevented from contacting the rolling member.

The return pipe may be a molding formed from resin or metal. The return pipe has a central portion and side leg portions extending from both end portions of the central portion and the lubricant applying portion is arranged in the leg portion of the return pipe.

In another preferred embodiment, the return member comprises a deflector so that the rolling member rolling on the rolling member rolling groove of the screw shaft gets over an outer diameter portion of the screw shaft to again return the rolling member to the rolling member rolling groove of the screw shaft, the lubricant applying portion being arranged inside the deflector.

In the above embodiments, the nut is provided with a lubricant storage portion from which the lubricant is supplied to the lubricant applying portion and a lubricant supplying passage for supplying the lubricant from the lubricant storage portion to the lubricant applying portion.

According to the preferred embodiments mentioned above, the lubricant can be stably supplied to the lubricant applying portion from the lubricant supplying member.

In addition, when the return pipe is formed from the resin or metal material through molding operation, the return pipe can be manufactured with a partially thickened portion in which the lubricant applying member can be located.

The nature and further characteristic features of the present invention will be made more clear from the description mentioned hereunder with reference to the accompanying drawings.

DESCRIPTION OF THE PREFERRED EMBODIMENTS

Figure 1:
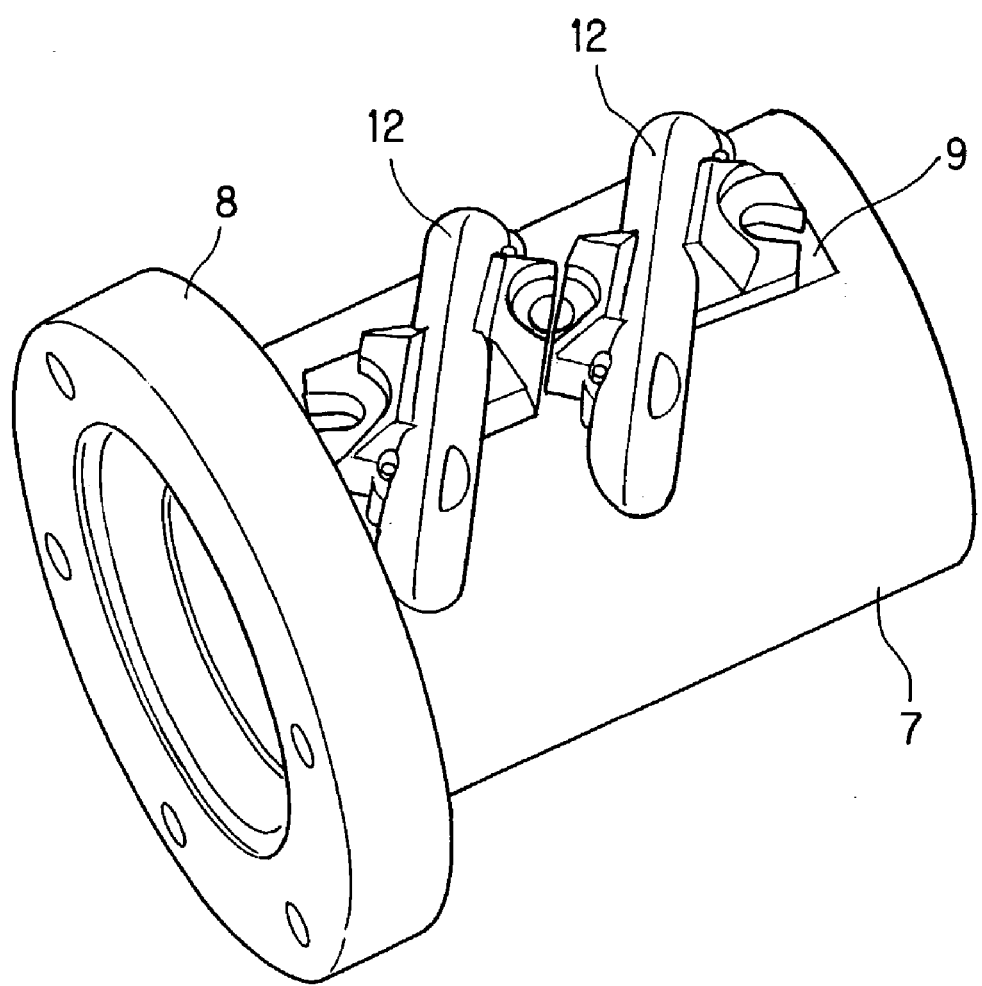
FIG. 1 is a perspective view of a nut and a return pipe of a screw device having a lubricant applying device according to a first embodiment of the present invention.
Figure 2:
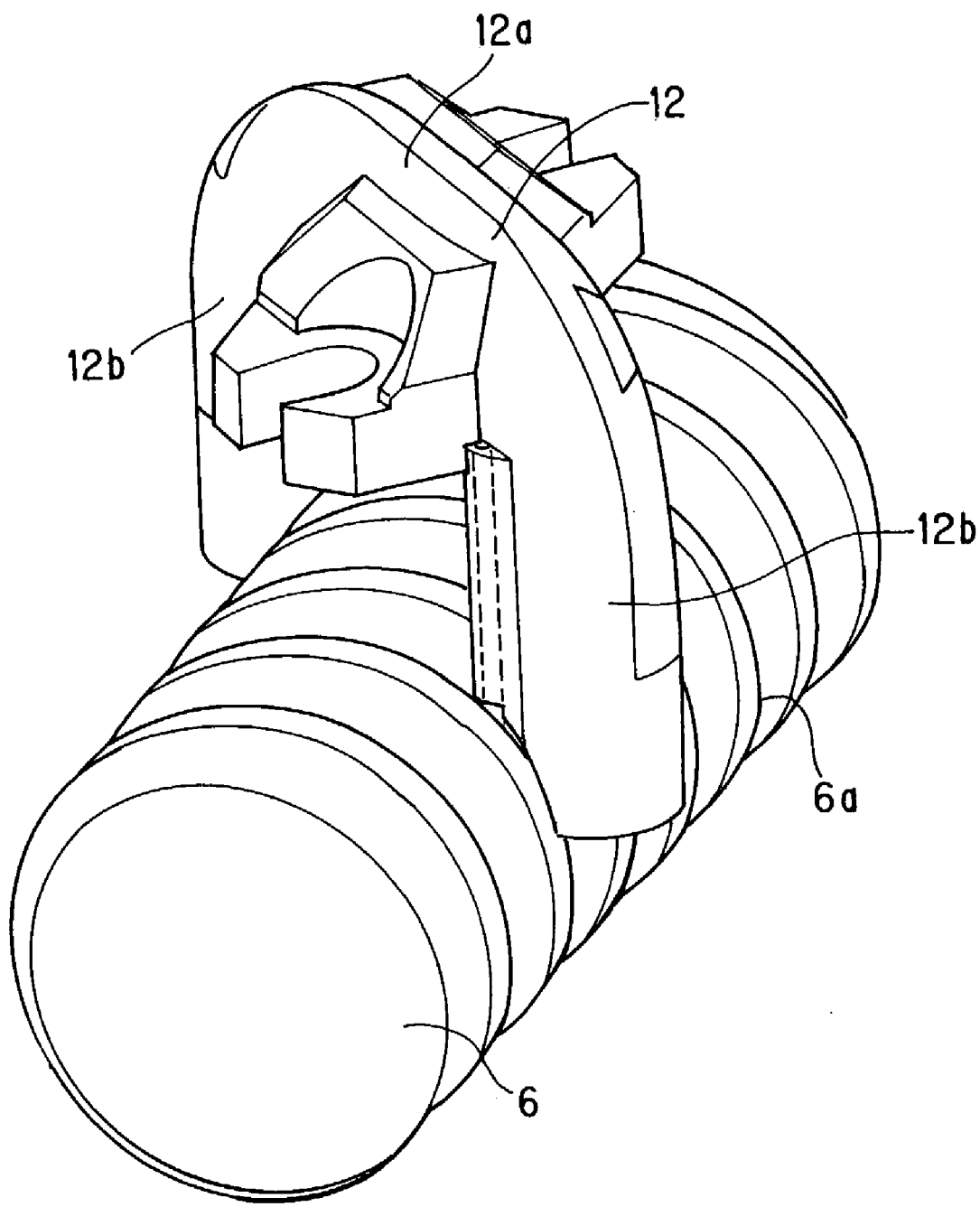
FIG. 2 is a perspective view, in an enlarged scale, of the return pipe applied to a screw shaft of the screw device of FIG. 1.
Figure 3:
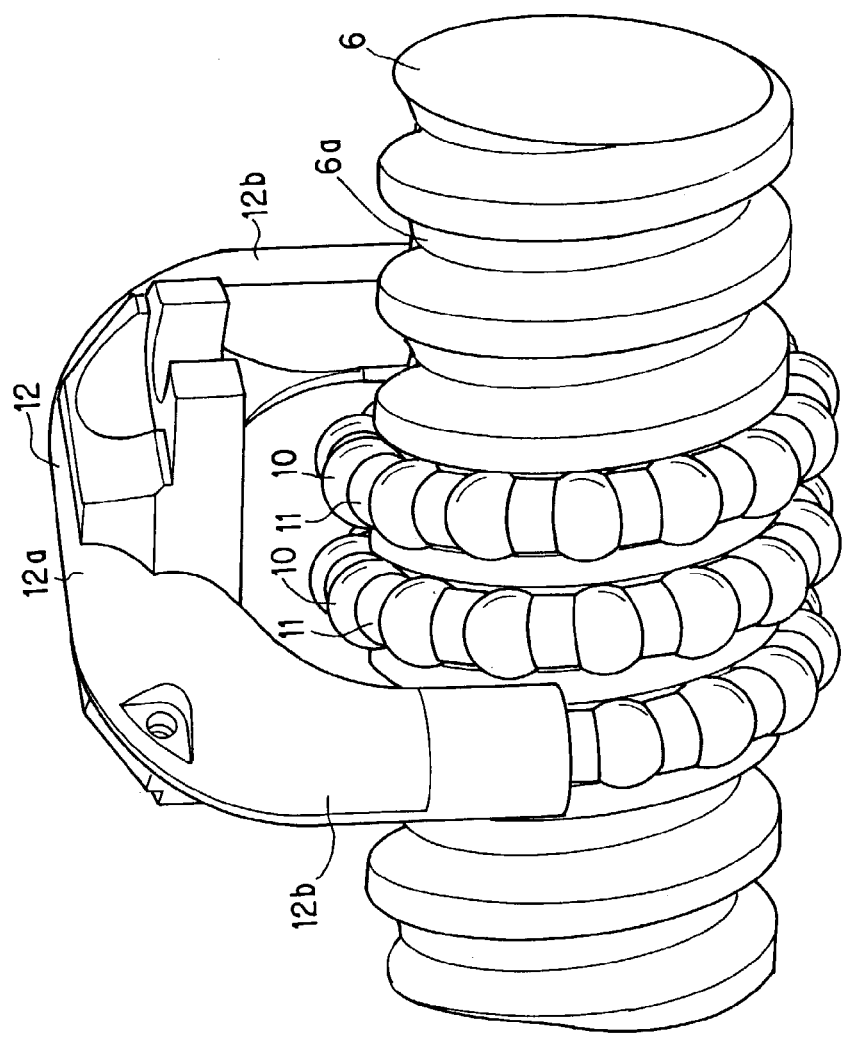
FIG. 3 is a perspective view of the screw device equipped with a number of balls as rolling members.

FIGS. 1 to 3 represent a screw device provided with lubricant applying device according to a first embodiment of the present invention.

The screw device of this embodiment comprises a screw shaft 6 having an outer periphery to which a ball rolling groove 6a, as rolling member rolling groove, having a spiral shape is formed, a nut 7 having an inner periphery on which a loaded ball rolling groove, as loaded rolling member rolling groove, having a spiral shape corresponding to the spiral ball rolling groove 6a and a number of balls 10, 10, - - - , 10 as rolling members disposed in a loaded rolling passage formed by the ball rolling groove 6a of the screw shaft 6 and the loaded ball rolling grove of the nut.

The ball rolling groove 6a having an approximately semi-circular section and a spiral constant lead is formed on the outer periphery of the screw shaft 6 through grinding working or rolling working. The nut 7 has an approximately cylindrical shape and is provided, at its one end face, with a flanged portion 8 through which a screw device is mounted to a machine or the like. A diameter and an axial length of the nut 7 are determined in accordance with a load to be applied. The nut 7 is formed with an upper surface, in a state as shown in FIG. 1, for example, having a partially flat portion 9 which is chamfered, and the flat portion 9 is formed with a plurality of return pipe fitting holes into which leg portions 12b, 12b of a return pipe 12 are inserted.

In a preferred embodiment, for example, the nut 7 is mounted with two return pipes 12, 12, the return pipe 12 being a pipe for communicating one and other end portions of the loaded rolling passage with each other so as to constitute a circulation passage into which the balls 10 can circulate, and thus, the inner periphery of the return pipe 12 constitutes a loaded return passage.

The return pipe 12 has approximately a gate shape in an outer appearance having a central portion 12a and a pair of leg portions 12b, 12b extending from both end portions of the central portion 12a. The paired leg portions 12b, 12b are positioned on both sides of the axial line of the screw shaft 6 with several pitches of, for example, 2.5 pitches, in the loaded rolling passage. According to such structure, the balls 10, 10, - - - , 10 are scooped in the return pipe 12 after the rolling of 2.5 turns on the ball rolling groove of the screw shaft 6. The return pipe 12 is secured to the nut 7 by fastening means such as bolts.

In this first embodiment, although, as shown in FIG. 3, spacers 11, 11, - - - , 11 arranged each between adjacent two balls 10, 10 to prevent the balls from contacting with each other, the present invention will be applicable to a structure in which such spacers 11 may be eliminated.

Figure 4:
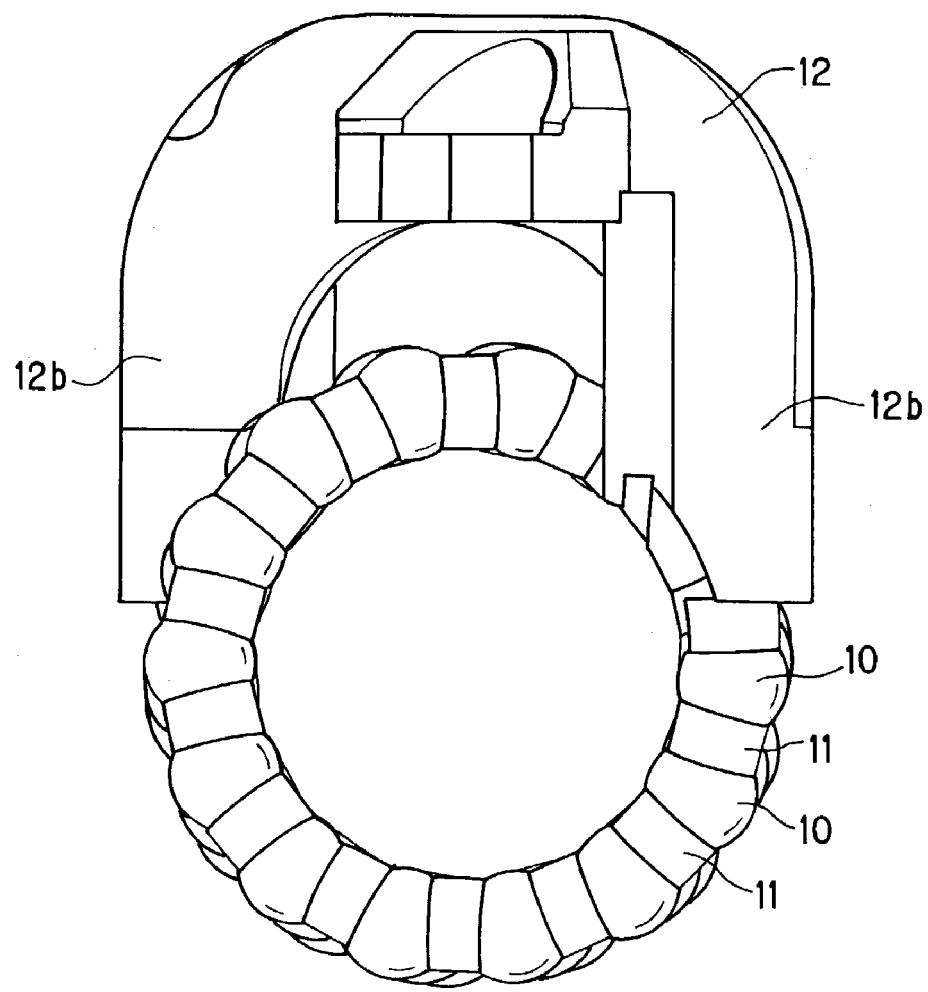
FIG. 4 is a front view, shown from an axial direction of the screw shaft, of a number of balls and the return pipe.
Figure 5:
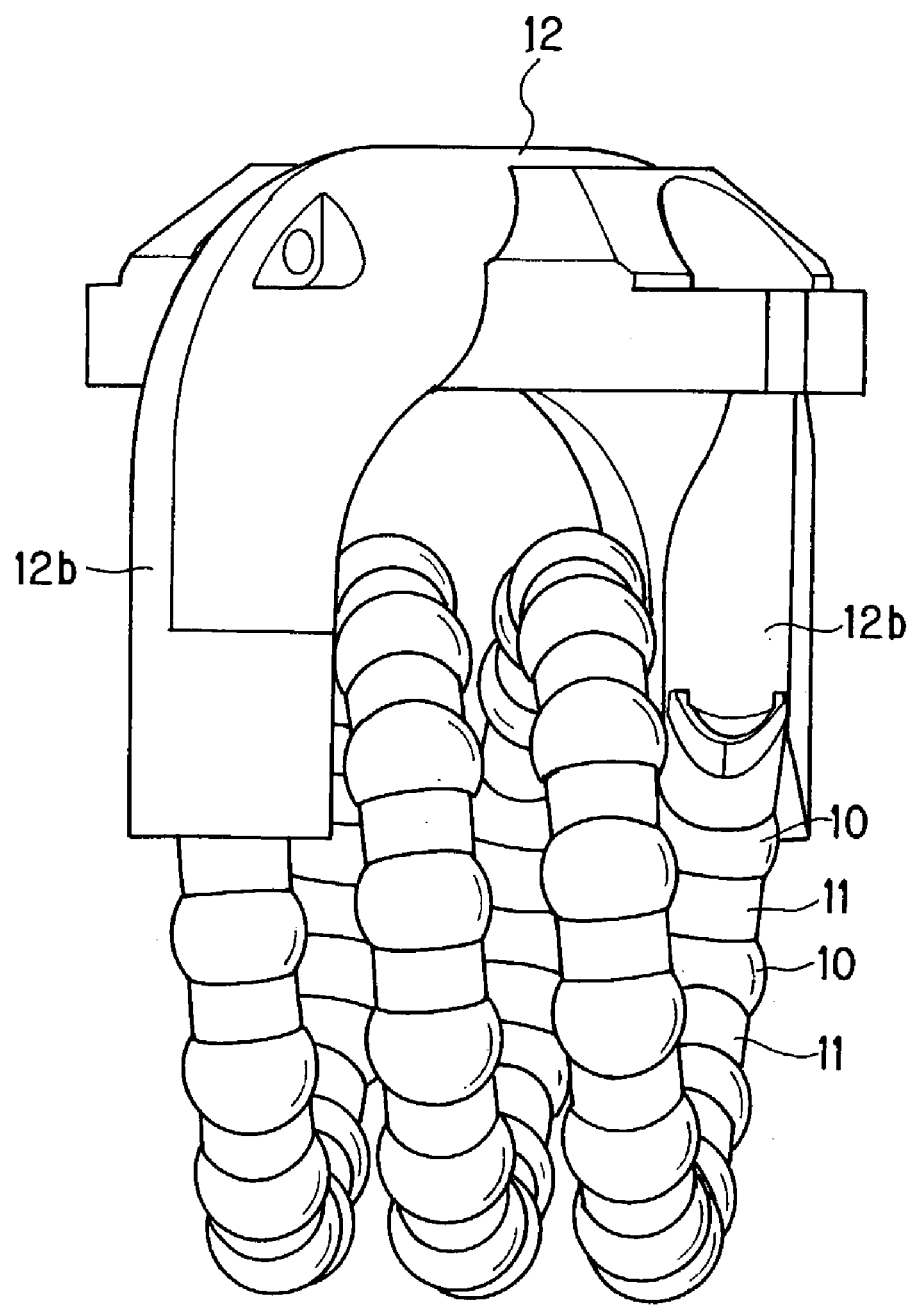
FIG. 5 is a side view of a number of balls and the return pipe.

FIGS. 4 and 5 show the balls 10, 10, - - - , 10 and the return pipe 12. As mentioned above, the balls 10 roll, while describing a spiral locus, in the loaded rolling passage formed on the periphery of the screw shaft 6. During such rolling motion, when the ball 10 is scooped up in the tangential direction of the spiral loaded rolling passage, it is possible to scoop up the ball 10 in the direction along which the ball 10 itself advances, so that any forcible force is not applied to the return pipe 12. Therefore, the center lines of the inner peripheries of the paired leg portions 12b, 12b of the return pipe 12 are arranged in the tangential direction of the loaded rolling passage as shown in FIG. 4, and as also shown in FIG. 5, incline so as to accord with the lead angle of the spiral loaded rolling passage.

Figure 6:
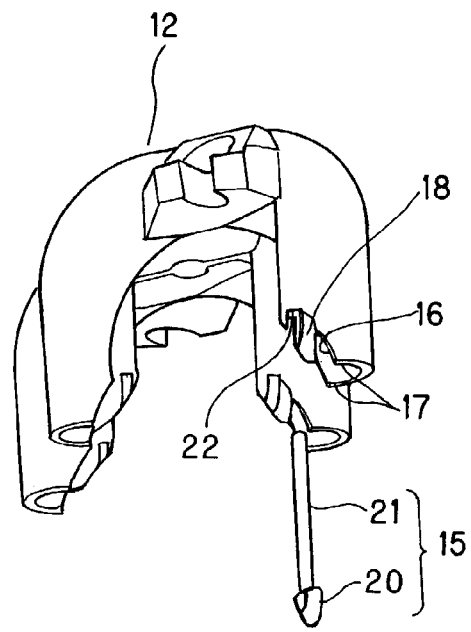
FIG. 6 is a perspective view of the return pipe.
Figure 7:
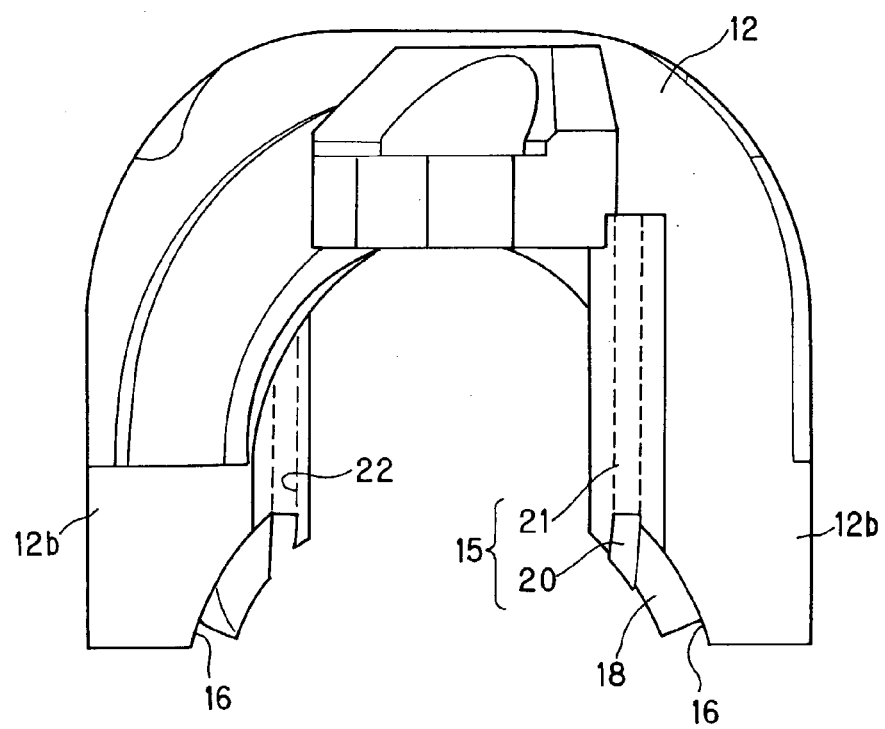
FIG. 7 is a side view of the return pipe.
Figure 8:
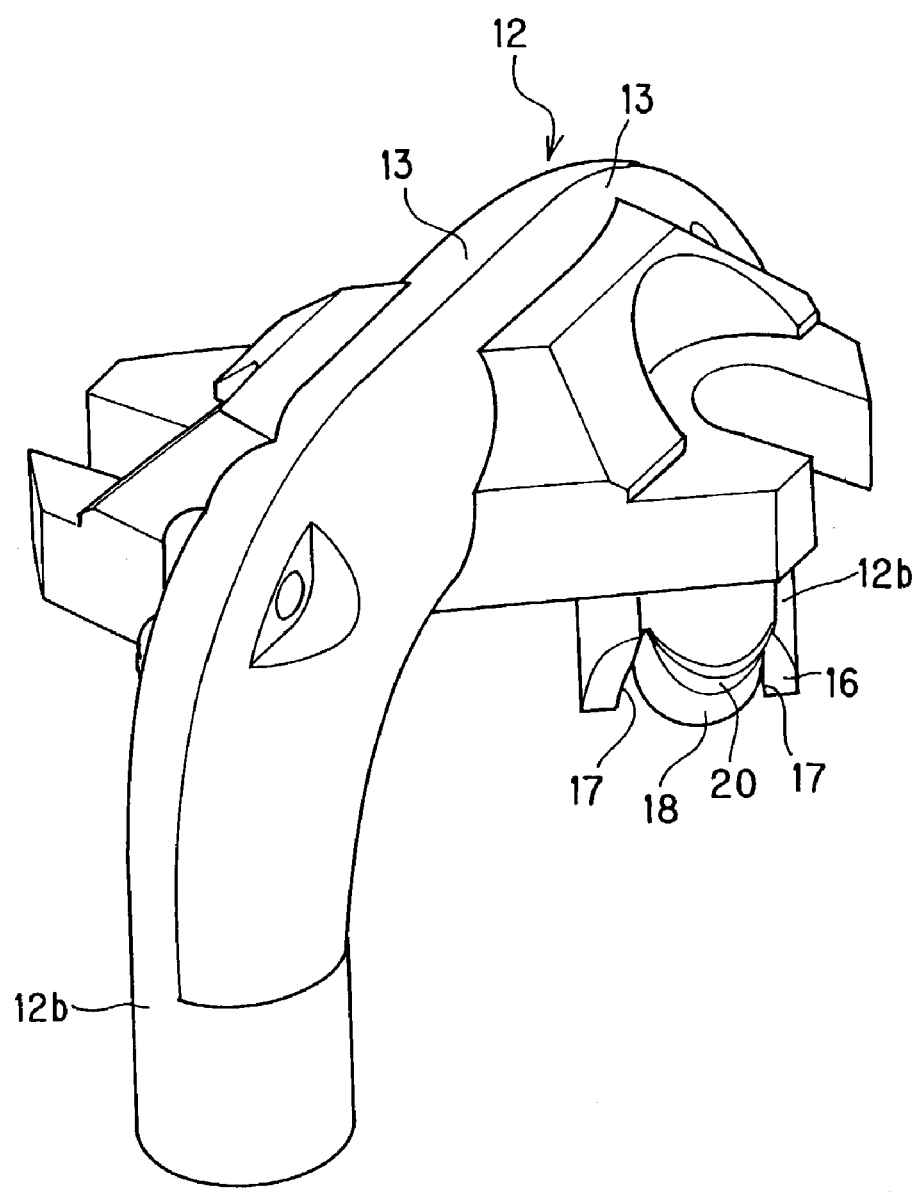
FIG. 8 is also a perspective view of the return pipe.

FIGS. 6 to 8 represent the return pipe 12, which is formed as a resin mold product formed from two parts 13, 13 dividable along the axial direction thereof so that the return pipe 12 can be molded. These divided two parts 13, 13 are thermally caulked, fused or joined, fastened by means of joining sheet, or clipped so as to provide the return pipe 12 as an assembly.

At an occasion that the return pipe 12 is molded from the divided two parts 13, 13, the return pipe 12 can be formed from either one of resin and metal material. When it is molded from the metal material, thermal treatment will be executed to metal powders. And on the other hand, when molded from the resin material, injection molding process will be adopted. The return pipe 12 molded from the metal material will provide a strength similar to the strength of conventional metal tube, and the return pipe 12 molded from the resin material will prevent dust from generating.

Furthermore, the fact that the respective divided parts 13, 13 of the return pipe 12 are manufactured through the molding process can contribute the improvement of the precision of the return pipe 12 and the manufacturing cost. Moreover, it will become possible to change the shape of an outer appearance of the return pipe 12 by forming the return pipe 12 so as to have thickened portion only to a necessary portion thereof without forming the return pipe 12 with even thickness. According to this feature, a portion of the return pipe 12 having a thickness, for inserting a lubricant applying member 15, which will be described hereinlater, can be easily formed.

The return pipe 12 is formed with a cut opening 16 having a width gradually narrowed toward the inside thereof. Both the side edge portions of this cut opening 16 act ball scoop-up portions 17, 17, and the balls 10 can be scooped by the scoop-up portions 17, 17 while being guided thereby. In this first embodiment, a tongue-shaped projection 18 is formed to a root portion of the scoop-up portions 17, 17. As mentioned before, the spacer 11 is disposed between the adjacent balls, but the spacer 11 has a diameter smaller than that of the ball 10. Because of this reason, in a case where the spacer 11 and the ball 10 has a large distance and a slight gap is caused therebetween, there is a fear that the spacer 11 comes off a predetermined track and, as a result, the scoop-up portions 17, 17 may bite the spacer 11. This defect will be eliminated by providing the projection 18. That is, even in a case where there exists a large prescribed range of distance between the ball 10 and the spacer 11, the spacer 11 can be guided into the return pipe 12. In this operation, because the ball 10 has the diameter larger than that of the spacer 11 and is guided by the scoop-up portions 17, 17, the ball 12 never contact the projection 18.

Lubricant applying member insertion holes 22 are formed to the thickened portions of the paired leg portions 12b, 12b of the return pipe 12 so as to extend in the axial direction thereof. A lubricant applying member 15 for applying lubricant to the ball rolling groove 6a of the screw shaft 6 is inserted into each of these lubricant applying member insertion holes 22. The lubricant applying member 15 is composed of a lubricant applying portion 20 contacting the ball rolling groove 6a and a shaft or shank portion 21 inserted into the leg portion 12b of the return pipe 12. The lubricant applying portion 20 has approximately semi-circular shape in conformity with the shape of the ball rolling groove 6a and, on the other hand, the shaft portion 21 has a fine rod shape. The lubricant applying member 15 is formed from a fiber confounding member such as felt or oil containing member such as sintered resin, and is utilized for applying the lubricant to the ball rolling groove 6a on the basis of capillary phenomenon utilized such as for felt pen.

Figure 9:
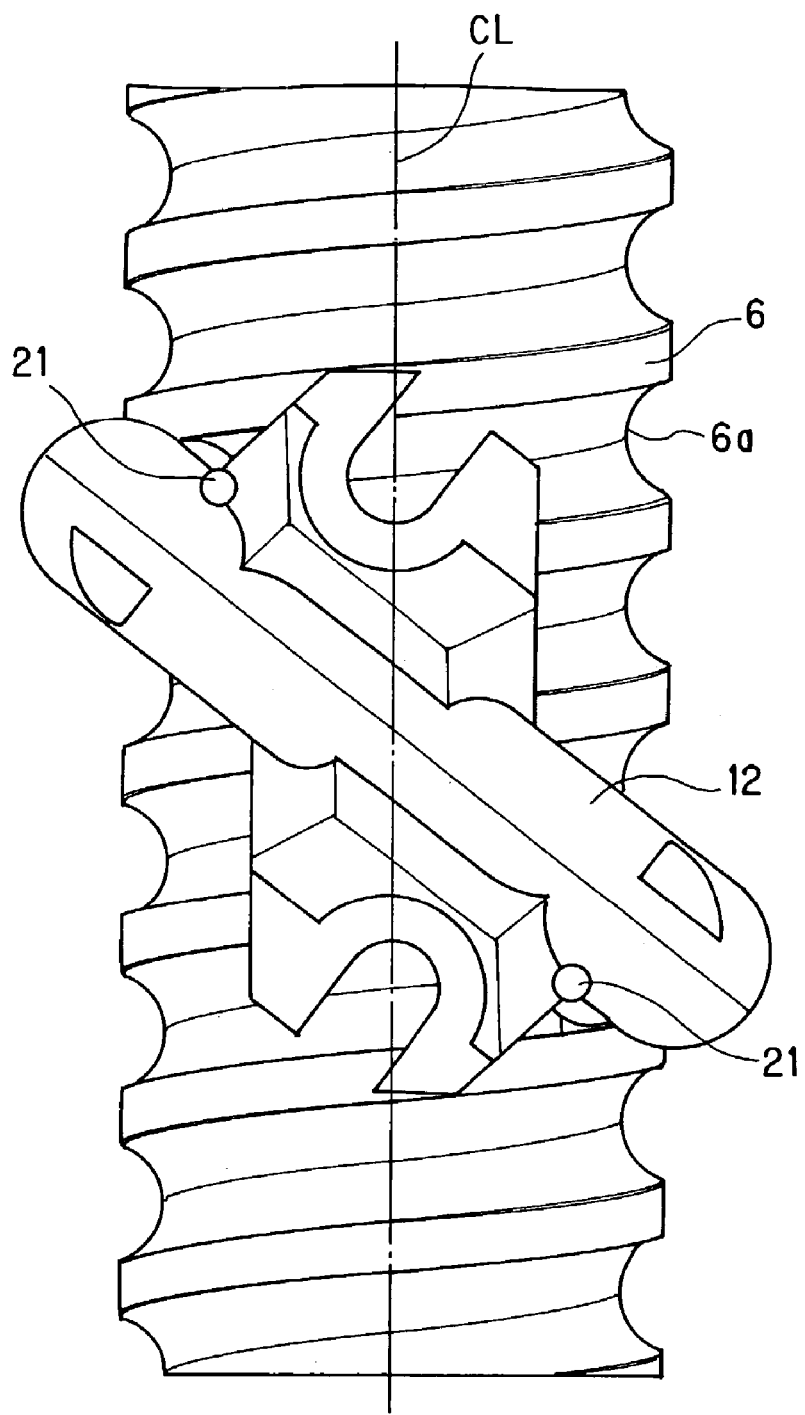
FIG. 9 is a plan view of the screw shaft and the return pipe.
Figure 10:
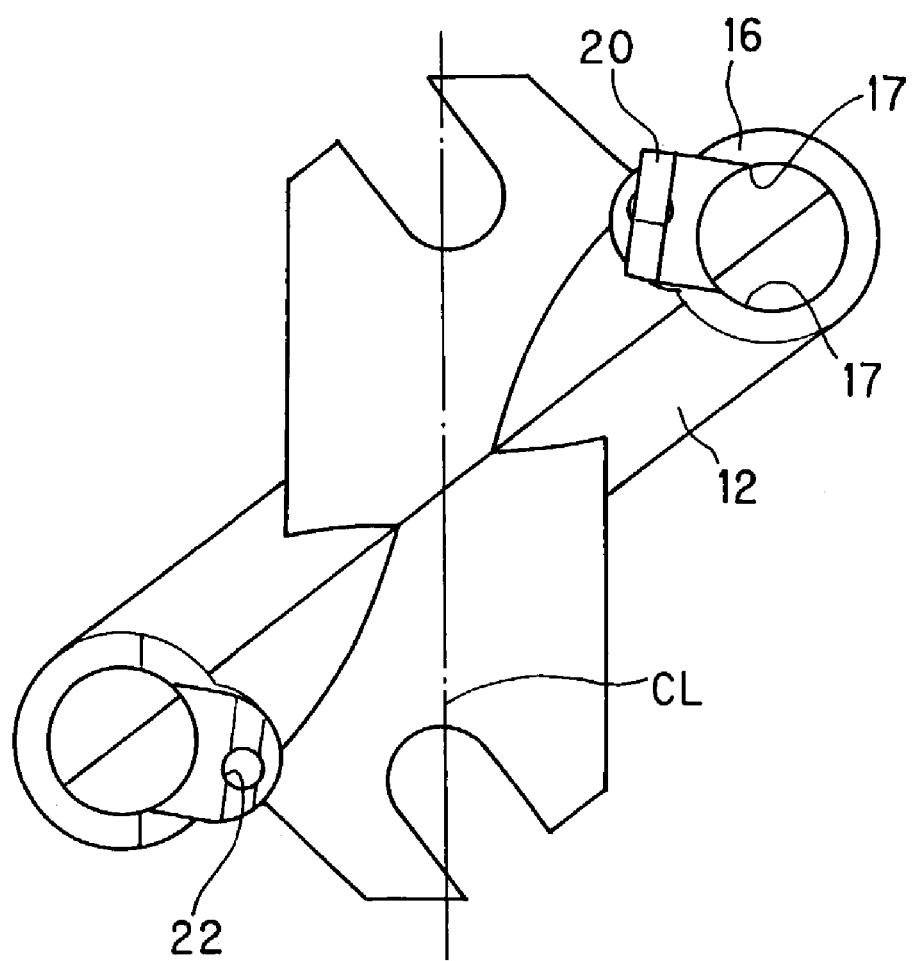
FIG. 10 is a bottom view of the return pipe.
Figure 13:
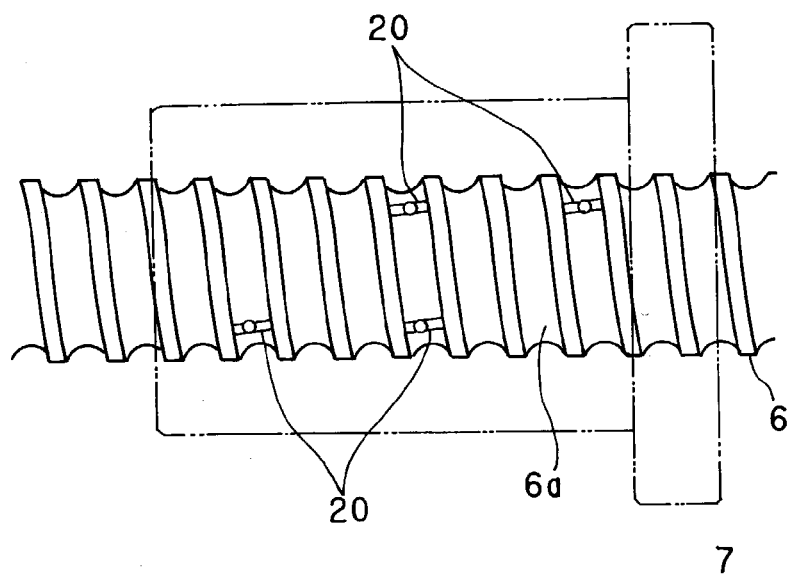
FIG. 13 includes FIG. 13A being a plan view showing positional relationship of the screw shaft, the nut and a lubricant applying portion and FIG. 13B being a plan view showing this relationship in which an area on which the lubricant can be applied is shown.
Figure 13:
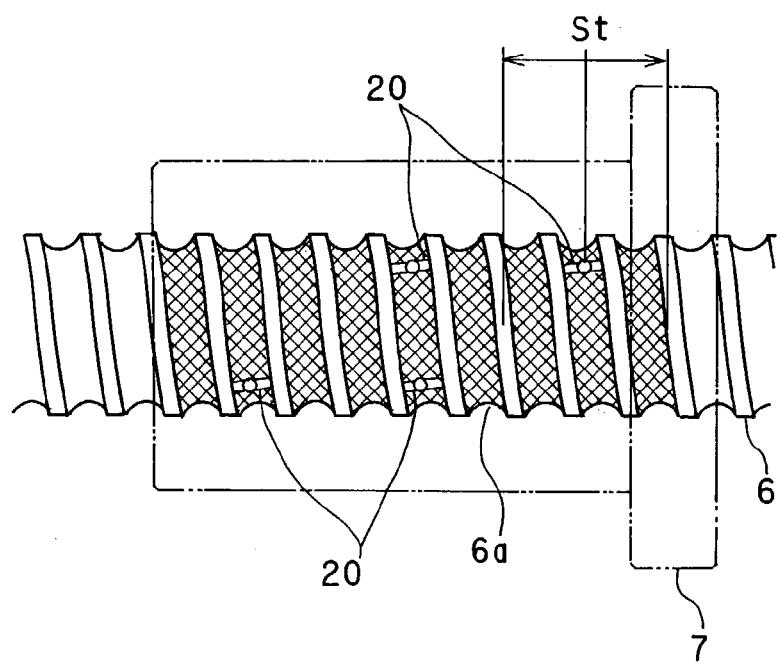

In this embodiment, it is important to what portion the lubricant applying portion 20 is positioned. The lubricant applying portion 20 is arranged within the full length of the axial direction of the nut 7, and in more detail, it is positioned inside the paired leg portions 12b, 12b of the return pipe 12 as shown in FIG. 13. That is, the lubricant applying portion 20 is positioned near an area in which the balls 10, 10, - - - , 10 roll in the ball rolling groove 6a but the balls 10, 10, - - - , 10 do not exist therein FIGS. 9 and 10 are views representing the positional relationship between the screw shaft 6, return pipe 12 and the lubricant applying portion 20, in which FIG. 9 is a plan view of the screw shaft and the return pipe and FIG. 10 is a bottom view of the return pipe. As mentioned above, the scoop-up portions 17, 17 for scooping up the rolling members are formed on the return pipe 12. Further, the lubricant applying portion 20 is arranged to the center line (CL) of the screw shaft 6 from the scoop-up portions 17, 17 in a plan view.

Figure 11:
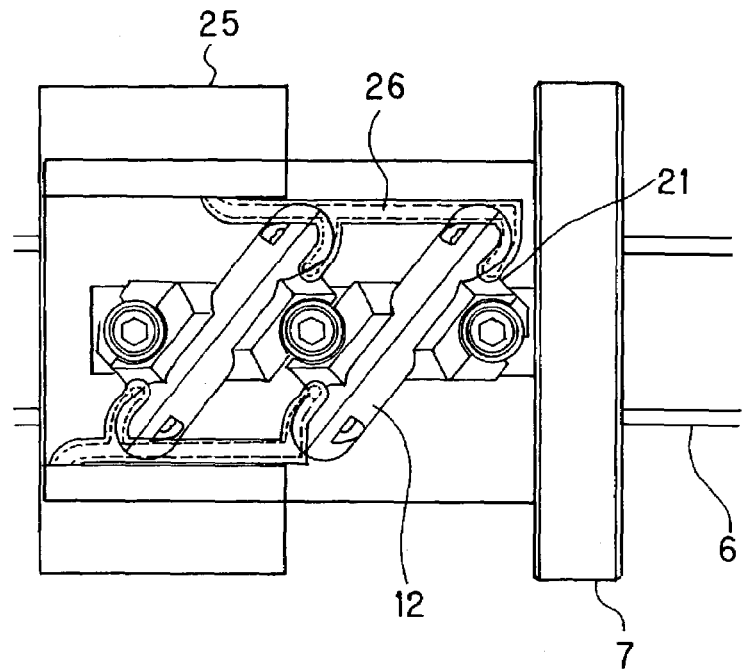
FIG. 11 is a plan view showing an oil tank and an oil pipe.
Figure 12:
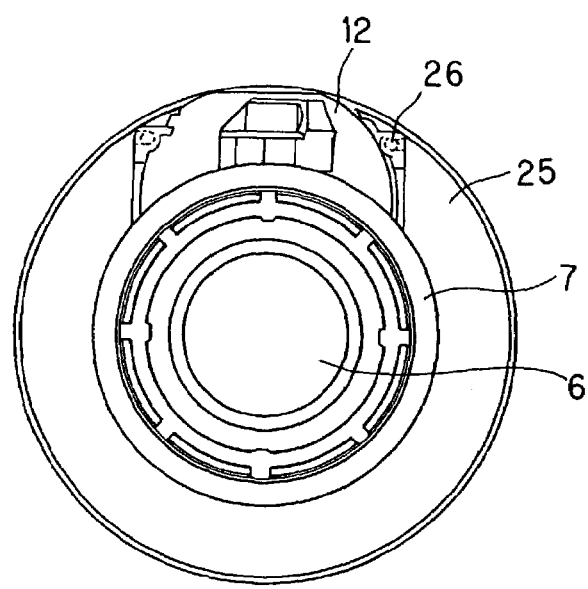
FIG. 12 is a front view showing an oil tank and an oil pipe.

FIGS. 11 and 12 show an oil tank as a lubricant storage chamber for supplying the lubricant to the lubricant applying portion 20 and an oil pipe 26 as a lubricant supply passage. The oil tank 25 has a shape of circular ring having a partial cutout portion and fitted into the outer periphery of the nut without mounting to the end face of the nut 7. The oil tank 25 is not limited to such structure. The oil tank 25 is composed of a member capable of storing a lot of lubricant to be supplied to the lubricant applying portion 20 such as tank having an inner space for storing the lubricant, or a fiber confounding member absorbing the lubricant and having a high percentage of void like a felt, or an oil containing member such as sintered resin or sponge.

The oil pipe 26 is a pipe for drawing out the oil from the oil tank 25, and the front end of the oil pipe 26 is connected to the shaft portion 21 of the lubricant applying member 15 so as to supply the lubricant to the lubricant applying portion 20 thereof. This oil pipe 26 is also fixed to the nut 7.

The line for supplying the lubricant from the oil tank 25 to the lubricant applying portion 20 may be incorporated with control means for controlling the supply amount of the lubricant. Such control means may utilize a fiber confounding member such as a felt having a higher percentage of void than that of the lubricant applying portion 20 or oil containing member such as sintered resin, or utilize a structure which includes an oil amount adjusting thin plate separating the oil tank 25 and the oil pipe 26 from each other, and an oil supply hole for supplying the lubricant through the oil amount adjusting plate being formed thereto.

With reference to FIG. 13A, showing the positional relationship between the screw shaft 6, nut 7 and the lubricant applying portions 20, the lubricant applying portions 20 are arranged inside the axial full length direction of the nut 7 and, that is, inside the return pipe 12. Further, FIG. 13B shows an area to which the lubricant can be supplied through the lubricant applying portions 20.

When the screw shaft 6 is rotated in the state that the lubricant applying portions 20 are arranged within the axial full length direction of the nut 7, the lubricant can be supplied entirely to an area (shown in oblique lines in FIG. 13B) on which the balls in the ball rolling groove 6a roll even when the nut 7 reciprocates in a short stroke St.

Moreover, the location of the lubricant applying portions 20 inside the return pipe 12 makes it possible to apply the lubricant to the ball rolling groove 6a at portions near the ball running area of the ball rolling groove 6a, so that the lubricant can be surely applied to the ball rolling area of the ball rolling groove 6a. Furthermore, since the lubricant can be applied to the ball rolling groove 6a just before the time that the ball 10 in the return pipe 12 is returned to the loaded rolling passage, the lubricant can be effectively supplied to the portions between the balls 10 and the ball rolling groove 6a.

Figure 14:
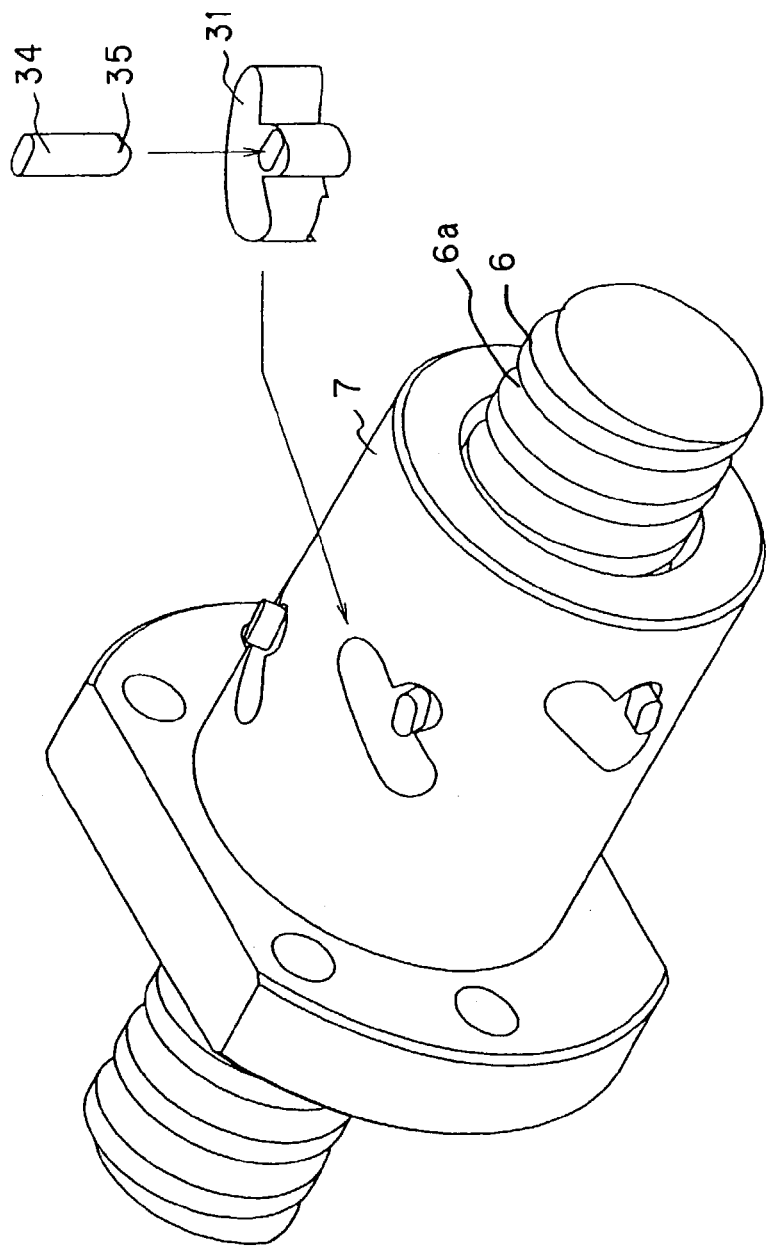
FIG. 14 is a perspective view of a screw device according to a second embodiment of the present invention.

FIG. 14 represents a screw device according to the second embodiment of the present invention, and in this second embodiment, differing from the first embodiment mentioned above, a deflector 31 is utilized in place of the return pipe 12 as return member. This deflector 31 has a structure capable of scooping up the balls 10, 10, - - - , 10 rolling on the ball rolling groove 6a and returning them to a portion one-turn before a scooped portion of the groove 6a.

As like as the first embodiment, a number of balls 10, 10, - - - , 10 are disposed and arranged between the loaded ball rolling groove of the nut 7 and the ball rolling groove 6a of the screw shaft 6, which constitute a loaded rolling passage.

A return groove having an S-shape is formed on a bottom surface of the deflector 31 so as to communicate one end of the loaded rolling passage with another end one-turn before the one end of the loaded rolling passage. This S-shaped return groove acts to scoop up, in the radial direction of the screw shaft 6, the ball 10 rolling on the ball rolling groove 6a towards the deflector 31, make the ball 10 get over the screw thread of the screw shaft 6 and return the ball 10 to the portion of the ball rolling groove 6a one-turn before the scooped portion of the thread (one lead before the scooped portion). This return groove has the most recessed portion at the central portion of the deflector 31 so that the ball 10 entering the return groove can get over the outer diameter portion of the screw shaft 6.

A return passage is composed of this return groove and the loaded rolling passage, the return passage hence constituting a substantially circular-ring shaped endless circulation passage at an outside portion of the screw shaft 6. In the screw device of this embodiment, one deflector 31 of the described character is provided for one row of balls 10, 10, - - - , 10. Further, since the number of ball rows is determined in accordance with the load applied to the screw device, the number of the deflector 31, for example, six, is determined as occasion demands in accordance with the load to be applied to the screw device.

Figure 15:
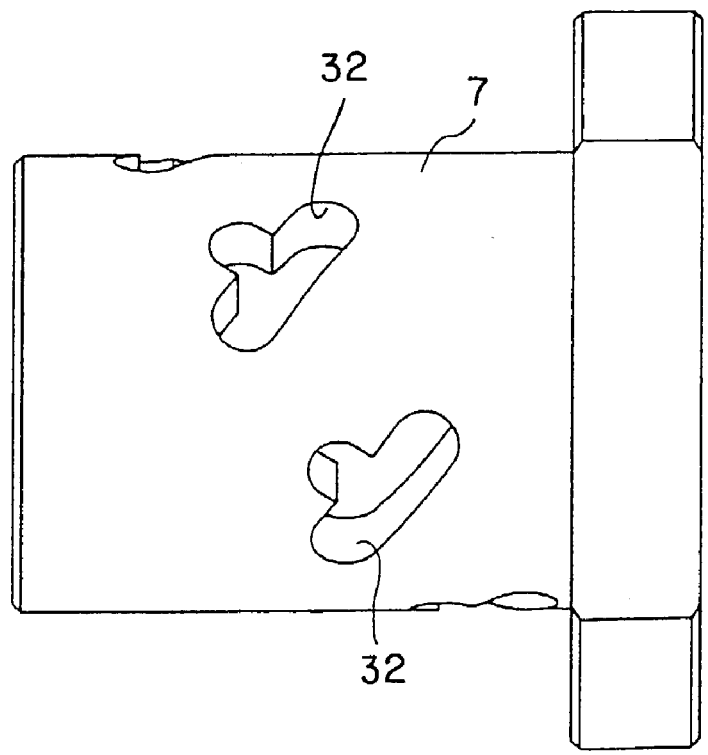
FIG. 15 is an illustrated perspective view of the nut of the second embodiment.

With reference to the illustration of nut 7 of FIG. 15, the nut 7 is formed with a deflector insertion hole 32 for mounting the deflector 31. The deflector insertion hole 32 passes through the nut 7 from the outer peripheral side of the nut 7 to the inner peripheral side thereof so as to entirely provide an approximately T-shape. A plurality of such deflector insertion holes 32 are formed with even distance in the circumferential direction of the nut 7 in a condition that the adjacent two holes 32 are disposed with a distance more than one lead in the axial direction of the nut 7.

Figure 16:
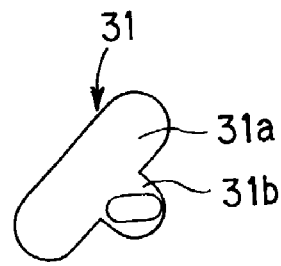
FIG. 16 represents a deflector including FIG. 16A being a plan view and FIG. 16B being a side view.
Figure 16:
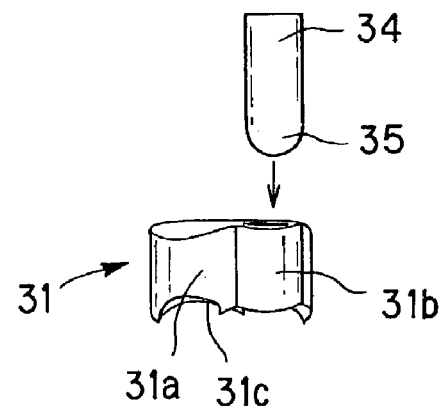

With reference to FIGS. 14 and 16, showing the deflector 31, the deflector 31 provides entirely T-shape and comprises a deflector body 31a having the bottom portion on which the S-shaped groove 31c is formed and a lubricant applying member accommodation portion 31b into which a lubricant applying member 34 is accommodated. The lubricant applying member 34 finely extends towards the center of the nut and provides a section having, for example, a flat rectangular shape. The lubricant applying member 34 is provided, at its front end portion, with an arcuate lubricant applying portion 35 contacting the ball rolling groove 6a.

Further, in this embodiment, the oil tank storing the lubricant and the oil pipe supplying the lubricant to the lubricant applying member have substantially the same structures as those in the first embodiment, so that the details thereof are omitted here to be described.

Figure 17:
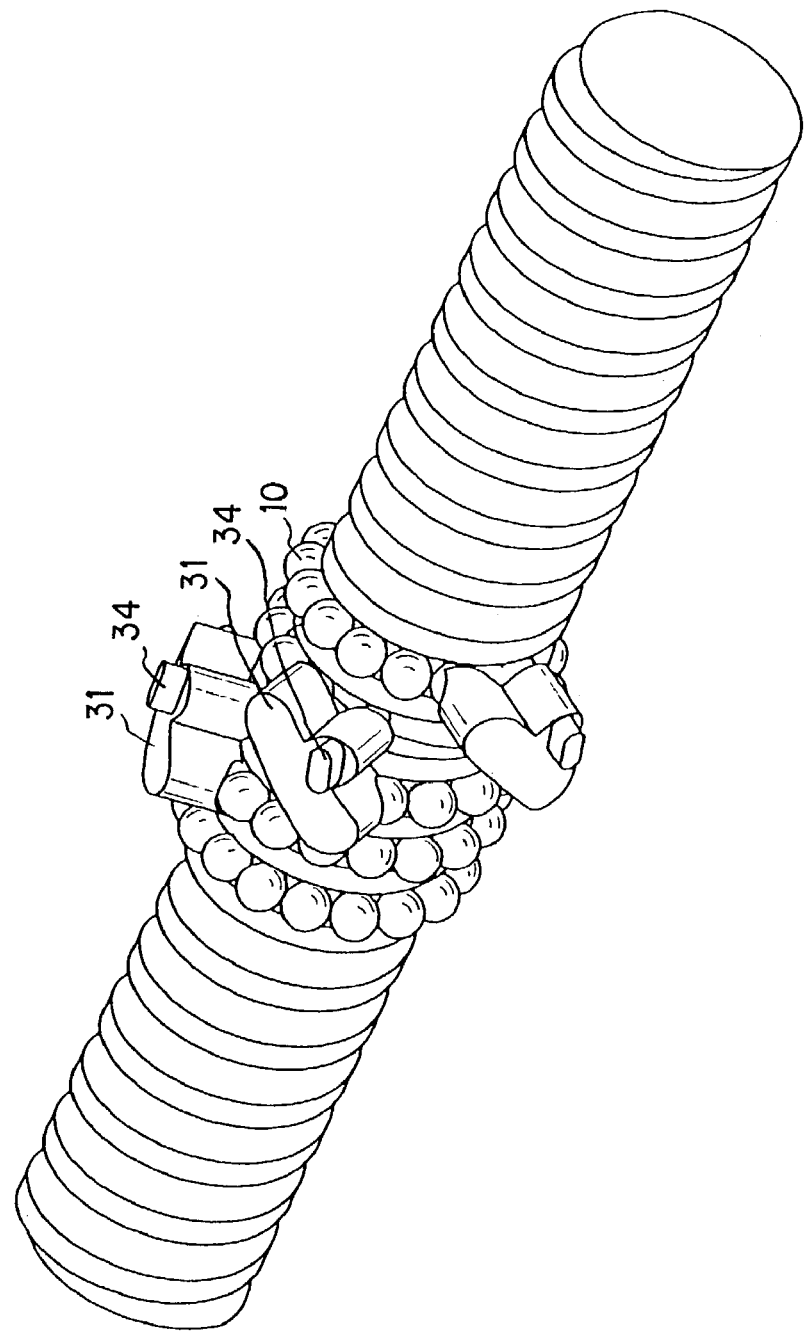
FIG. 17 is a perspective view showing a positional relationship between the ball circulation passage and the lubricant applying member.
Figure 18:
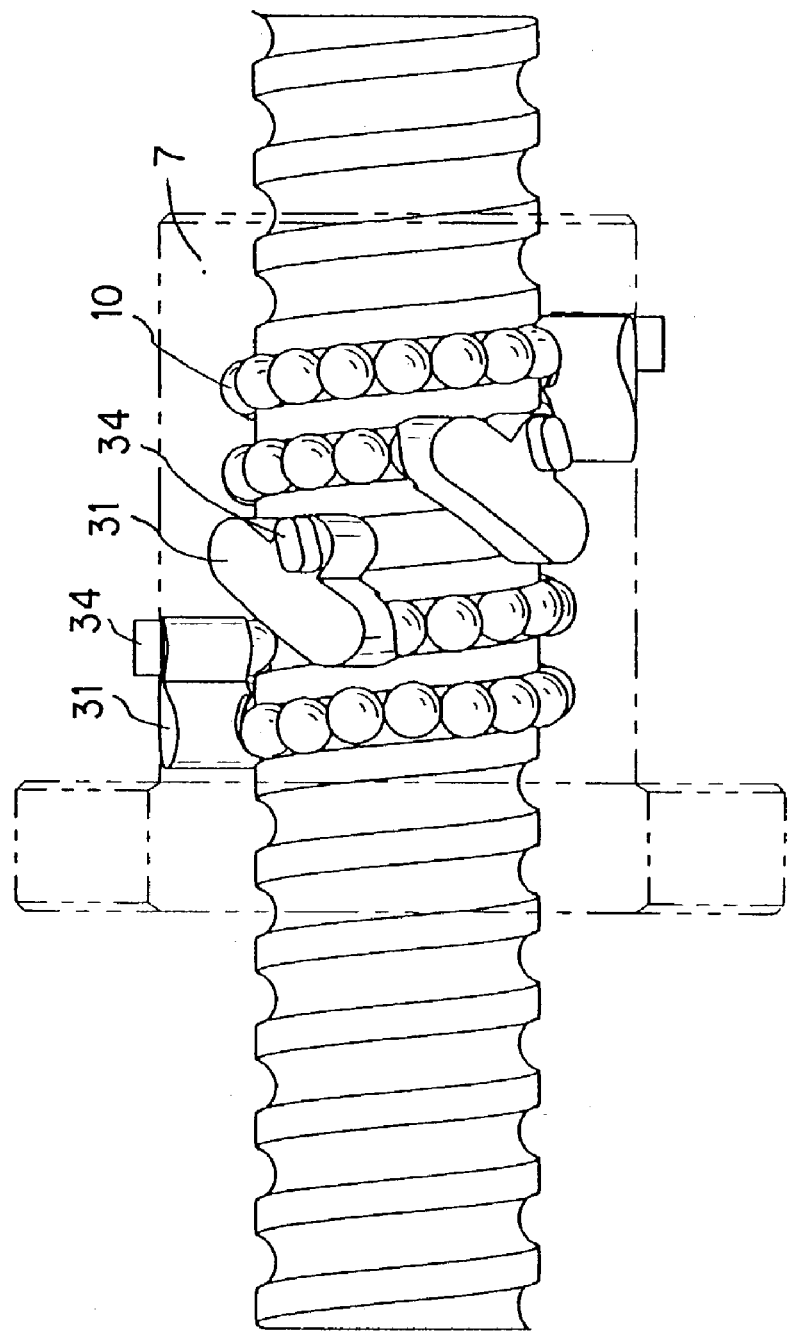
FIG. 18 is a side view showing a positional relationship between the ball circulation passage and the lubricant applying member.
Figure 19:
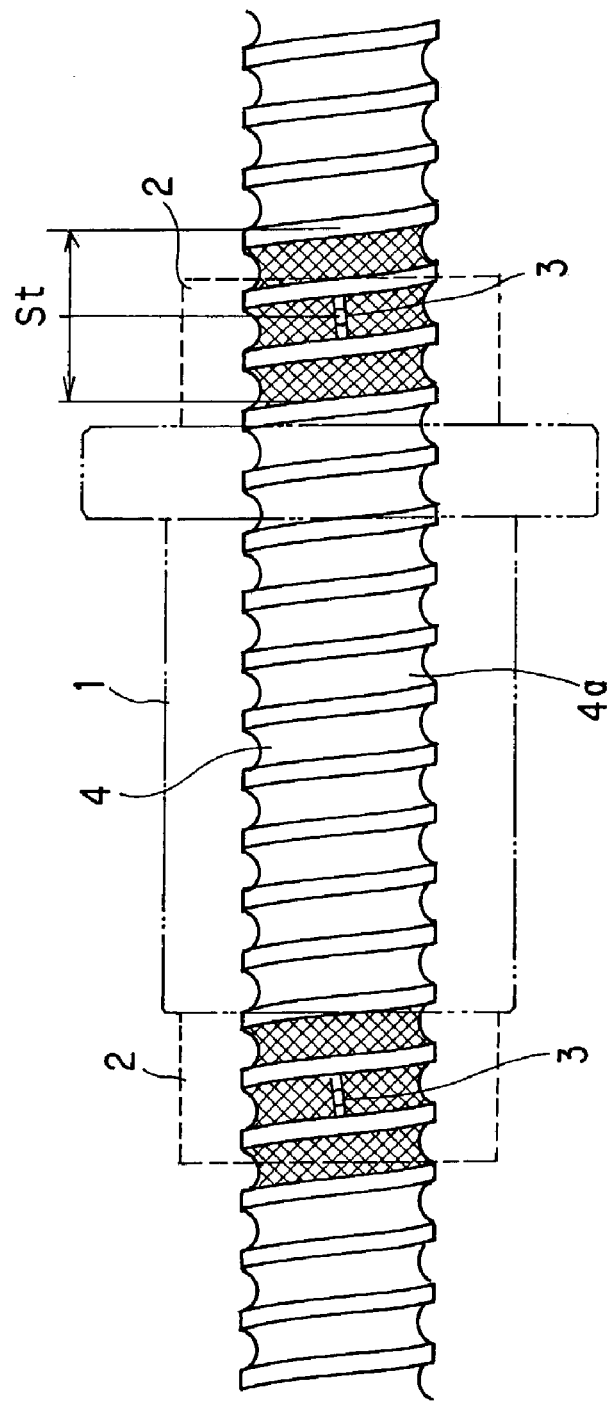
FIG. 19 is a plan view showing an example of a conventional structure in which lubricant applying devices are mounted to both end portions, in the axial direction, of a nut.

FIGS. 17 and 18 represent the positional relationship between the ball circulation passage and the lubricant applying member 34. The nut is formed with a plurality of ball circulation passages, and the lubricant applying members 34 are arranged inside the deflectors 31 and between the loaded rolling passages of the respective circulation passages. For this reason, the lubricant applying portion 35 is arranged near the area in which the balls 10 roll along the ball rolling groove 6a but the balls 10 do not exist.

In this second embodiment, as like as in the first embodiment, the lubricant can be applied to the ball rolling groove 6a of the screw shaft 6 at the portions near the ball circulation passage, the lubricant can be effectively applied to the area in which the balls roll along the ball rolling groove 6a even in the case of the short stroke of the nut 7 with respect to the screw shaft 6.

Further, it is to be noted that the present invention is not limited to the described embodiment and many other changes and modifications may be made without departing from the scopes of the appended claims.

For example, the screw device of the present invention is not limited to the screw device of high load and low (short) stroke type and will be applicable to other various screw devices. In addition, the lubricant applying portion may be arranged between the circulation passages of the screw device having the return pipe as well as the screw device having the deflector. This lubricant applying portion may be arranged outside the return pipe as far as in the full length position of the rut. Furthermore, the scoop-up portion of the return pipe may be formed with a lip. Rollers may be also preferably utilized as well as bolls as rolling members.

The present application claims priority under 35 U.S.C § 119 to Japanese Patent Application No. 2002-30940 filed on Feb. 7, 2002 entitled "SCREW DEVICE HAVING LUBRICANT APPLYING PORTION". The contents of that application are incorporated herein by reference in their entirety.

What is claimed is:

1. A screw device, comprising:
a screw shaft provided with a spiral rolling member rolling groove on an outer peripheral portion thereof;
a nut provided, on an inner peripheral portion thereof, with a loaded rolling member rolling groove having a spiral shape corresponding to the spiral rolling member rolling groove formed on the screw shaft;
a number of rolling members disposed in a loaded rolling passage formed by the rolling member rolling groove of the screw shaft and the loaded rolling member rolling groove of the nut;
a return member provided for the nut and arranged so as to connect one end and another end portions of the loaded rolling passage so that the rolling members rolling on the loaded rolling passage circulate, said return member comprising a deflector in which the rolling member rolling on the rolling member rolling groove of the screw shaft gets over an outer diameter portion of the screw shaft to again return the rolling member to the rolling member rolling groove of the screw shaft, said deflector having a lubricant applying member accommodation portion into which a lubricant applying member is accommodated; and wherein said lubricant applying member is provided in the return member so as to supply a lubricant by contacting with the rolling member rolling groove of the screw shaft, said lubricant applying member being arranged inside the deflector.

2. A screw device comprising:

a screw shaft provided with a spiral rolling member rolling groove on an outer peripheral portion thereof;

a nut provided, on an inner peripheral portion thereof, with a loaded rolling member rolling groove having a spiral shape corresponding to the spiral rolling member rolling groove formed on the screw shaft;

a number of rolling members disposed in a loaded rolling passage formed by the rolling member rolling groove of the screw shaft and the loaded rolling member rolling groove of the nut;

a return member provided for the nut and arranged so as to connect one and another end portions of the loaded rolling passage so that the rolling members rolling on the loaded rolling passage circulate, said return member comprising a return pipe, said return pipe having a central portion and side leg portions extending from both end portions of the central portion, and lubricant applying portion being arranged in at least one of the leg portions of the return pipe; and a lubricant applying member provided in said lubricant applying portion of the return member so as to apply a lubricant by contacting with the rolling member rolling groove of the screw shaft, said lubricant applying member being arranged inside the return pipe.

3. The screw device according to claim 2, wherein said return pipe is provided with scoop-up portions for scooping up the rolling member at both end portions thereof, and in a plan view, said lubricant applying portion is arranged to a center line of the screw shaft from the scoop-up portion to prevent the lubricant applying portion from contacting with the rolling member.

4. The screw device according to claim 2, wherein said return pipe is a molding formed from resin.

5. The screw device according to claim 2, wherein said return pipe is a molding formed from metal.

6. The screw device according to any one of claims 3–5, 1 and 2, wherein said nut is provided with a lubricant storage portion from which the lubricant is supplied to the lubricant applying portion and a lubricant supplying passage for supplying the lubricant from the lubricant storage portion to the lubricant applying portion.

* * * * *